J. H. WELTY & G. HOLLINGER.
Improvement in Traps.
No. 127,721.    Patented June 11, 1872.
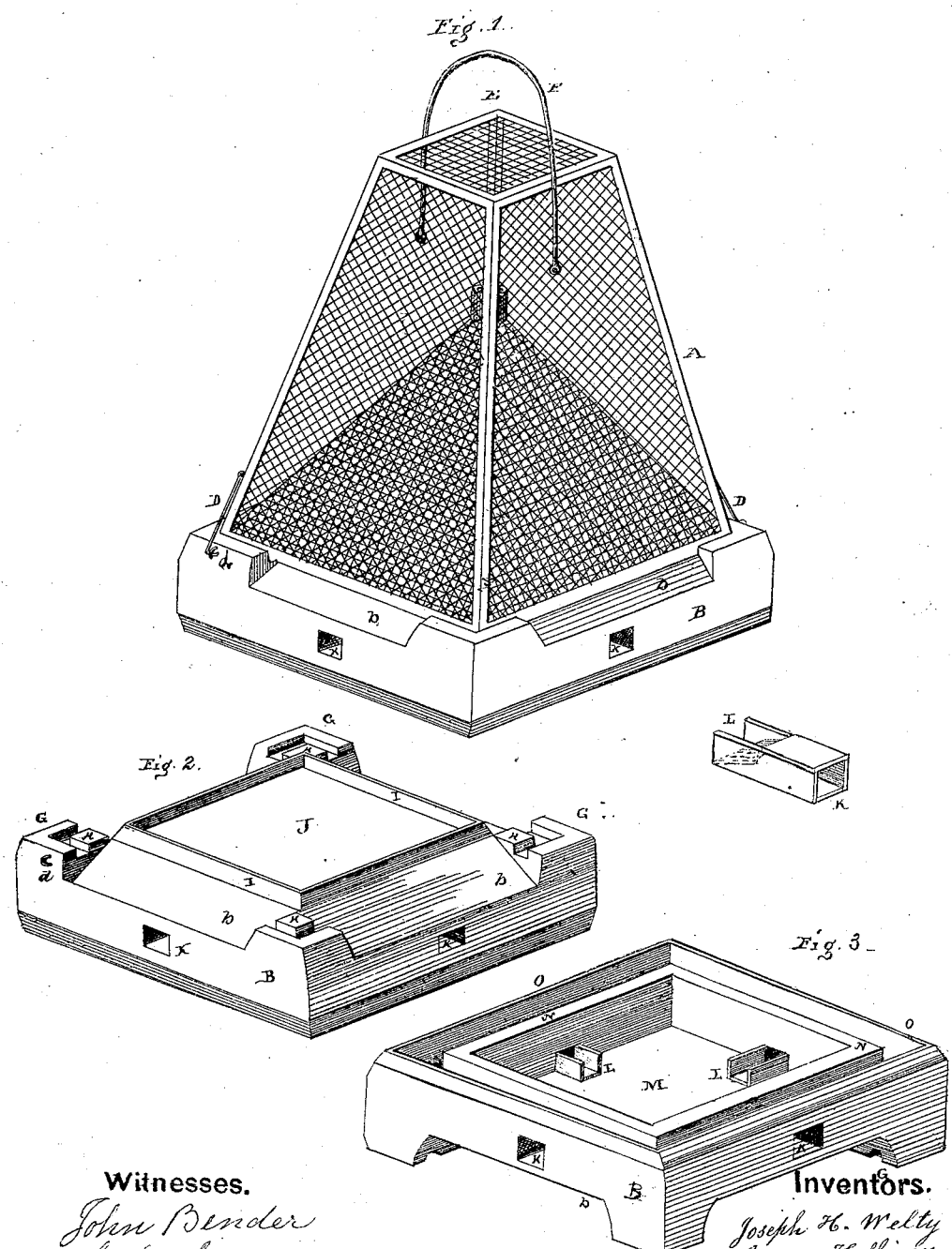
Witnesses.
John Bender
H. C. Stauffer
Inventors.
Joseph H. Welty
George Hollinger
per J. Stauffer Atty.

UNITED STATES PATENT OFFICE.

JOSEPH H. WELTY AND GEORGE HOLLINGER, OF MOUNT CARROLL, ILL.

IMPROVEMENT IN TRAPS.

Specification forming part of Letters Patent No. 127,721, dated June 11, 1872.

Specification describing certain Improvements in Traps, the joint invention of JOSEPH H. WELTY and GEORGE HOLLINGER, of Mount Carroll, Carroll county, in the State of Illinois.

The nature of our invention consists in the reversible bottom in combination with the double conical or pyramidical cage, so as to adapt it to insects which always seek escape by climbing or flying upward when entrapped, and for adapting it to special purposes, such as for capturing flies, ants, cockroaches, mice—in short it is a combined insect and animal trap.

Figure 1 is a perspective view of the trap and bottom to catch flies. Fig. 2 shows the one side of the bottom up, used as in Fig. 1. Fig. 3 shows the other side of the bottom, used for catching ants, &c.

The base or bottom B is square. The corners G H have a shallow groove, into which the base of the cage A sits. Between the corners G the side is beveled up beneath the frame or lower edge. There is a raised ledge, I, around the central portion of the bottom J, forming a shallow dish for depositing sweetened or other food to entice the flies, to which they gain access up the beveled ledges b I on the four sides. Thus under the canopy or interior pyramid C, made of wire or its equivalent, when satiated or disturbed, the flies never attempt to return by traveling downward; they rise on the wing, or seek to make their escape from the top, which is open for their accommodation, and having passed through and entered the outer pyramid or cage A, they gather around the sides toward the light, and very few will find the way out by which they entered. The top E forms or consists of a removable lid. F is a handle, and D hooks, by which the cage is connected with the eyes d to the bottom or base. This arrangement is especially adapted to catch flies during the day.

To entrap ants or cockroaches, the bottom B is reversed, Fig. 3. This has a groove between N O, all around, for the reception of the cage A. The center M forms a deep chamber, surrounded by the vertical walls N, through which, from the outside, at K, are perforations on each side with trough-guides. These may be open within or have a drop-gate, easily raised on entering, but prevent the return of the roach, mouse, or thing that may have been enticed by the bait.

Since the same bottom and cage are used we have various plans for tubes L, so that we do not confine ourselves to a fly, ant, or roach trap. Nay, if of sufficient size, it would form a fish-trap or animal-trap as well.

We are aware that there are all kinds of devices shown in traps; but we are not aware of any substantially combined in the manner shown and described. Therefore, What we wish to secure by Letters Patent, as our invention, is—

1. The reversible bottom B with its beveled sides b, ledges I to form the bait-chamber on one side, deep chamber M on the other side, with its trap-openings K for the inner drop or guide ways L, top and bottom grooves G H and O N, adapted for the reception of the square base of the wire cage A C, all constructed substantially in the manner and for the purpose specified.

2. In combination with the aforesaid reversible bottom with the hooks and eyes D d, we claim the doubly-pyramidal cage A C, when both the inner and outer are united by the common base of both, in the manner shown and for the purpose set forth.

JOSEPH H. WELTY.
GEO. HOLLINGER.

Witnesses:
A. B. NELSON,
DAVID LONG.